(12) United States Patent  
Shahidzadeh et al.

(10) Patent No.: US 8,365,983 B2  
(45) Date of Patent: Feb. 5, 2013

(54) RADIO-FREQUENCY RECONFIGURATIONS OF MICROELECTRONIC SYSTEMS IN COMMERCIAL PACKAGES

(75) Inventors: Shahrokh Shahidzadeh, Portland, OR (US); James Steven Fintel, Spring, TX (US); Jonathan Douglas, Portland, OR (US); William J. Kirby, Portland, OR (US); Tim Gates, Hillsboro, OR (US); Tim Abels, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 517 days.

(21) Appl. No.: 12/592,212

(22) Filed: Nov. 20, 2009

(65) Prior Publication Data

US 2011/0121065 A1    May 26, 2011

(51) Int. Cl.
*G06F 17/00* (2006.01)
(52) U.S. Cl. .... 235/375; 235/380; 358/1.15; 340/572.7; 340/572.8
(58) Field of Classification Search ................ 235/375, 235/380; 358/1.15; 340/572.7, 572.8
See application file for complete search history.

(56) References Cited

U.S. PATENT DOCUMENTS

| 8,065,443 | B1 * | 11/2011 | White et al. ................ 710/8 |
| 2002/0140966 | A1 * | 10/2002 | Meade et al. ............. 358/1.15 |
| 2005/0086553 | A1 | 4/2005 | Spencer |
| 2006/0071793 | A1 | 4/2006 | Pesavento |
| 2006/0145813 | A1 * | 7/2006 | Haller et al. ................ 340/10.1 |
| 2007/0096876 | A1 * | 5/2007 | Bridgelall et al. .......... 340/10.1 |
| 2007/0200708 | A1 * | 8/2007 | Hayama et al. ............ 340/572.7 |
| 2007/0247317 | A1 * | 10/2007 | Farrell ....................... 340/572.8 |
| 2007/0285239 | A1 * | 12/2007 | Easton et al. .............. 340/572.1 |
| 2008/0005536 | A1 | 1/2008 | Edwards et al. |
| 2008/0183671 | A1 * | 7/2008 | Chaves ........................... 707/3 |
| 2009/0008443 | A1 * | 1/2009 | Levovitz et al. .............. 235/380 |
| 2009/0037899 | A1 * | 2/2009 | Dharap et al. ................. 717/173 |
| 2009/0102505 | A1 | 4/2009 | Anderson et al. |
| 2009/0121018 | A1 | 5/2009 | Bauchot et al. |

FOREIGN PATENT DOCUMENTS

EP    1909517 A2    4/2008

(Continued)

OTHER PUBLICATIONS

Examination Report received for United Kingdom Patent Appl. No. 1016018.2, mailed on Jan. 17, 2012, 2 pages.
Combined Search and Examination Report received for United Kingdom Patent Application No. 1016018.2, mailed on Jan. 19, 2011, 6 pages.

(Continued)

*Primary Examiner* — Allyson Trail
(74) *Attorney, Agent, or Firm* — International IP Law Group, P.L.L.C.

(57) ABSTRACT

In one embodiment, the present invention includes a method for determining if a system is compatible with an up-binning or down-binning to a hardware resource of the system through RFID tag communication, receiving instructions from a remote server to upgrade the hardware resource if the system is compatible, and programming the hardware resource based on the instructions. In one such embodiment, the hardware resource may be programmed by use of programmable fuses to enable circuitry of the hardware resource. Other embodiments are described and claimed.

39 Claims, 5 Drawing Sheets

FOREIGN PATENT DOCUMENTS

| | | | |
|---|---|---|---|
| EP | 2069957 | A1 | 6/2009 |
| GB | 0610886 | A2 | 8/1994 |
| GB | 2434442 | A | 7/2007 |
| JP | 2001-43088 | A | 2/2001 |
| JP | 2005-011008 | A | 1/2005 |
| JP | 2007-25903 | A | 2/2007 |
| JP | 2008-500600 | A | 1/2008 |
| JP | 2008-129911 | A | 6/2008 |
| JP | 2008-535078 | A | 8/2008 |
| JP | 2008-257486 | A | 10/2008 |
| WO | 2005/116919 | A1 | 12/2005 |
| WO | 2006/104354 | A1 | 10/2006 |

OTHER PUBLICATIONS

Combined Search and Examination Report received for United Kingdom Patent Appl. No. 1120918.6, mailed on Dec. 22, 2011, 5 pages.

Office Action received for Japanese Patent Appl. No. 2010-212501, mailed on Jul. 24, 2012, 7 pages of Office Action including 4 pages of English Translation.

Combined Search and Examination Report received for United Kingdom Patent Application No. 1211254.6, mailed on Oct. 5, 2012, 4 pages. (English).

* cited by examiner

RADIO-FREQUENCY RECONFIGURATIONS OF MICROELECTRONIC SYSTEMS IN COMMERCIAL PACKAGES

TECHNICAL FIELD

Disclosed embodiments relate to semiconductor microelectronic devices and methods of reconfiguring them.

BACKGROUND

Many processor-based systems including personal computers (PCs), servers, personal digital assistants (PDAs), and cellular telephones among many others, include a mix of hardware and software components. Typically, a system includes a microprocessor, commonly referred to as a central processing unit (CPU), that handles a majority of processing operations, along with related components including, for example, memories and other storage media, chipsets and other processing devices, input/output (I/O) devices and the like. End users typically use such systems for various processing, entertainment, communication and other activities.

At the time of fabrication, the processor-based systems often have more computational capability than a given intended application.

BRIEF DESCRIPTION OF THE DRAWINGS

In order to understand the manner in which embodiments are obtained, a more particular description of various embodiments briefly described above will be rendered by reference to the appended drawings. These drawings depict embodiments that are not necessarily drawn to scale and are not to be considered to be limiting in scope. Some embodiments will be described and explained with additional specificity and detail through the use of the accompanying drawings in which.

DETAILED DESCRIPTION

The disclosed embodiments include radio-frequency identification (RFID) tags, each with unique identifiers. The RFID tag is used in a data- and command delivery mechanism to query, unlock, and reconfigure a hardware resource. Information items stored on the RFID tag includes the process genealogy and the performance capabilities of the hardware resource. Control instructions and methods that are stored in non-volatile random-access memory (NVRAM) in the RFID tag, is used to be read and to reconfigure settings in the hardware resource. Microcode-driven firmware is also used as RFID tag readers and programmers such as by a physical connection, e.g., a serial bus.

Reference will now be made to the drawings wherein like structures may be provided with like suffix reference designations. In order to show the structures of various embodiments most clearly, the drawings included herein are diagrammatic representations of integrated circuit structures. Thus, the actual appearance of the fabricated structures, for example in a photomicrograph, may appear different while still incorporating the claimed structures of the illustrated embodiments. Moreover, the drawings may only show the structures necessary to understand the illustrated embodiments. Additional structures known in the art may not have been included to maintain the clarity of the drawings. Although a processor chip and a memory chip may be mentioned in the same sentence, it should not be construed that they are equivalent structures.

Figure 1:
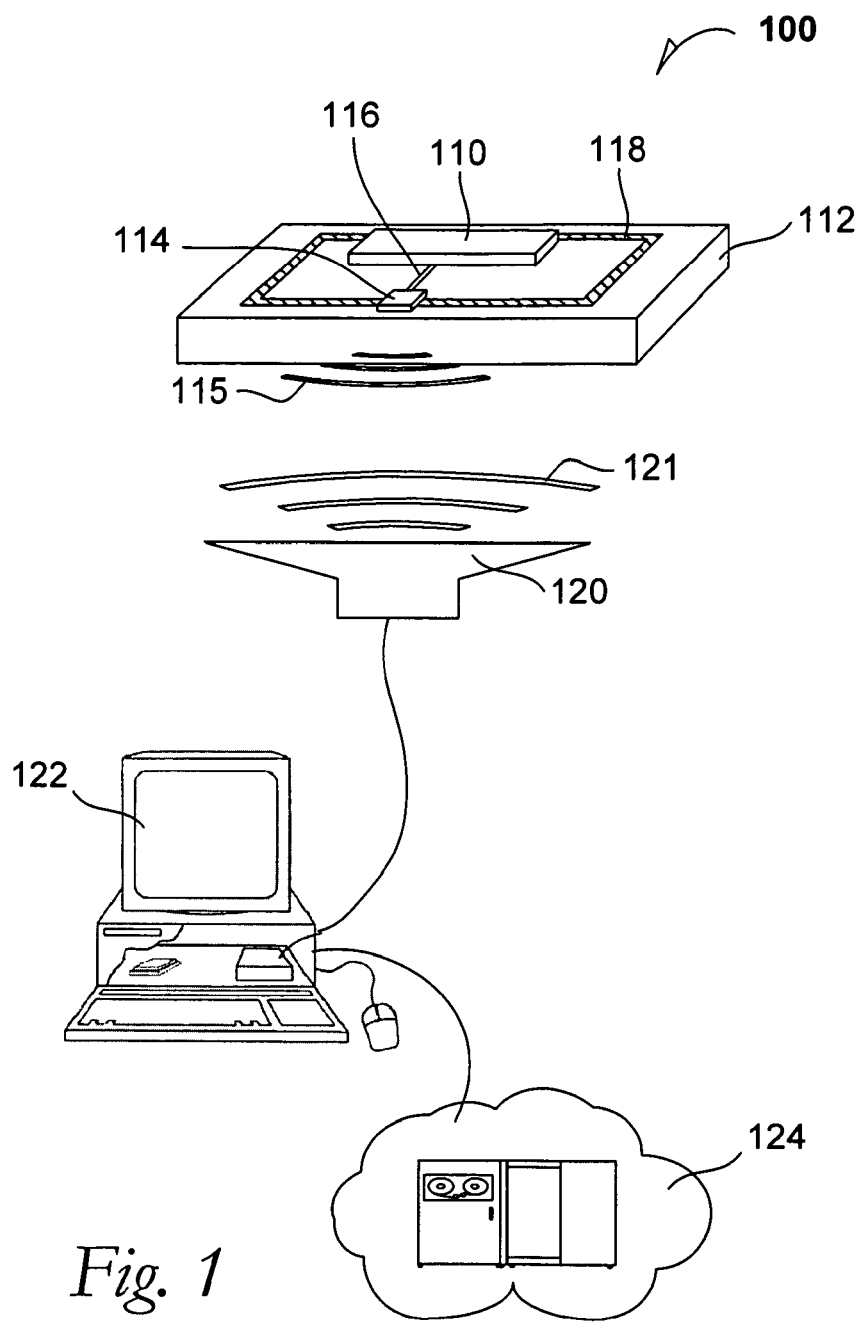
FIG. 1 is a schematic that includes an article according to an example embodiment.

FIG. 1 is a schematic 100 that includes an article according to an example embodiment. A hardware resource 110 such as a microprocessor is coupled to a mounting substrate 112. In an embodiment, the hardware resource 110 is a microprocessor made by Intel Corporation such as an Atom®, or a Celeron®, or a Core®. In an embodiment, the hardware resource 110 is a system-on-chip (SOC) that includes processing and other capabilities such as for a smart phone. In an embodiment, the hardware resource 110 is a memory chip or a memory module. In an embodiment, the hardware resource 110 is a chipset or an element of a chipset.

An RFID tag 114 is also disposed on the mounting substrate 112, and it is coupled to the hardware resource 110 by a serial bus 116 according to an embodiment. In an embodiment, the RFID tag is formed in a semiconductive substrate. The RFID tag 114 uses an RFID antenna 118 such as a copper loop 118. In an embodiment, the RFID antenna is a dipole structure that is tuned for the specific application.

The RFID antenna 118 is depicted as a loop on the mounting substrate 112 in this embodiment. In an embodiment, the RFID antenna is located on a motherboard where the mounting substrate 112 is a component package disposed on the mother board. In an embodiment, the RFID antenna is located on a chassis where the mounting substrate is a component package coupled to a larger substrate. In an embodiment, the RFID antenna is integrated into the shell of the system into which the RFID tag is installed. For example, a smart phone outer shell has the RFID antenna molded as an integral part of the shell.

In an embodiment, the RFID tag 114 carries a unique identifier that is related to the specific hardware resource 110. The RFID tag 114 also stores data related to the synergy of the hardware resource 110 and the mounting substrate 112.

The RFID tag 114, serial bus 116, and RFID antenna 118 may be referred to as a radio-frequency (RF) communication capability for the hardware resource 110. In an embodiment, however, the RF communication capability is disposed integral with the hardware resource ("in the silicon") such that the functionalities of at least the RFID tag 114 and serial bus 116 are integrated in the semiconductive material of the hardware resource 110.

An antenna 120 such as a dongle with firmware is coupled to a RFID reader device that is coupled to a computing system 122 and the computing system 122 is coupled to a secure database 124. The computing system 122 is depicted as a generic desktop computer but it may be any suitable computing system that is not hard-wired to the hardware resource 110. In an embodiment, the hardware resource 110 is authenticated with the secure database 124 through the RFID tag 114 by allowing the computing system 120 to query 110 and issue a license to the RFID tag 114 which has a unique encrypted identifier. The secure database 124 (also referred to as a remote server 124) issues a license that is written by RF communication to the hardware resource 110 or another component in the system.

In an embodiment, the hardware resource 110 is used as a secure source of reconfiguring any or all other components in a system by use of communication through the RFID tag 114 to the secure database 124. For example, a solid-state drive is reconfigured or up- or down-binned though use of the hardware resource 110. In an example embodiment, memory usage is reconfigured or up- or down-binned through use of the hardware resource 110. In an example embodiment, software is reconfigured such as up- or down-graded through use of the hardware resource 110. In an example embodiment, firmware is reconfigured or up- or down-binned through use of the hardware resource 110.

Unit-level traceability (ULT) data with respect to the hardware resource 110 and the mounting substrate 112 and tag 114 are cached on the tag 114 and also stored at the secure database 124. The ULT data is stored as a copy in a secure database 124 with a business entity that is associated with the manufacturing genealogy of the hardware resource 110. In some embodiments, the secure database 124 is located remotely from the hardware resource 110. In any event, "remote database" refers herein to a secure database that may or may not be located remotely from the given hardware resource(s).

Manufacturing genealogy includes several of the conditions of processing and assembly of the hardware resource 110 and the mounting substrate 112, although they may each be manufactured by a different entity.

The ULT data may be related to each of the hardware resource 110 and the mounting substrate 112, as well as the RFID tag 114. In an embodiment, a ULT datum includes date of manufacture. In an embodiment, a ULT datum includes the location of manufacture, also referred to as "fab" and may include a subdivision process used in the fab. In an embodiment, a ULT datum includes process equipment used in the manufacture such as tracking data of etch tool(s), spin-on tools, and thermal treatment tools to mention a few. In an embodiment, a ULT datum includes a specific process flow as process flow can be complicated and composed of dozens of sub-process flows. In an embodiment, a ULT datum includes the wafer-site origin of the hardware resource 110 where process variation may occur on a single wafer before singulation of the wafer into several hardware resources. Wafer-site origin data may track, for example, a particularly high-yielding sector on a wafer that is related to a portion of a stepper used in the process. Other manufacture data may be encrypted and cached on the RFID tag 114 and simultaneously at the secure database 124.

In an embodiment, clock speed of the hardware resource 110 is recorded such as at a bin-splitting test location. Clock speed may be variable due to down-binning requirements dictated in the marketplace, and the hardware resource 110 may be set to operate at less than 100 percent of the maximum clock speed. Consequently, the hardware resource 110 may be bin-split to a bin that is designated with a slower clock speed than the maximum capability due to marketing and sales conditions for the specific hardware resource 110.

Power consumption is a performance parameter that may also be encrypted and cached on the RFID tag 114 and in the secure database 124. Similar bin-split methods may be carried out where a given hardware resource 110 consumes less power than others, but market conditions do not require the lowest power configuration.

Cache size is a performance parameter that may also be encrypted and cached on the RFID tag 114 and in the secure database 124. Similar bin-split methods may be carried out where a given hardware resource 110 requires less cache than what has been fabricated and verified, but a given application does not require the total cache that was achieved.

A maximum-efficiency instruction set is a performance parameter that may also be encrypted and cached on the RFID tag 114 and in the secure database 124. Similar bin-split methods may be carried out where a given hardware resource 110 required less than the maximum-efficiency instruction set, or even an instruction set that does not need all features in the total instruction set.

The mounting substrate 112 may also have ULT data associated with it to assist in matching a given hardware resource 110 that has been mated with a given mounting substrate 112. Similar bin-splitting data for the mounting substrate 112 may be recorded. Other ULT data that can be securely stored includes field-collected data such as if delamination occurs between a mounting substrate 112 and the hardware resource 110.

Because of positive and negative synergistic effects between a given hardware resource 110 that has been mated with a given mounting substrate 112, ULT data for the mounting substrate 112 may play a role in several method embodiments disclosed herein. For example, a first mounting substrate supplied from a first supplier may create synergistic-performance characteristics when mated with a given hardware resource that a second mounting substrate supplied from a second supplier does not. In any event, ULT data is recorded with the secure database 124 for a given hardware resource 110 mated to a given mounting substrate 112.

The schematic 100 illustrates a method where a determination is made whether a system is compatible with a specific upgrade to the hardware resource 110. The system may include the hardware resource 110 alone or it may include the mounting substrate 112 and even other components that may be coupled to the hardware resource 110 and the mounting substrate 112. The hardware resource is communicated to by RF with the antenna 120 signaling 121 and the hardware resource 110 answering 115 through the RFID tag 114.

In an embodiment, the RFID tag 114 is entirely passive but it has the capability along with the RFID antenna 118 to communicate with the hardware resource 110 and reconfigure a performance characteristic, e.g., the clock speed. In an embodiment, the RFID tag 114 requires external assistance to re-program the hardware resource 110 such as it uses an external battery but the RF communications suffice for all logic-driven instructions to re-program the hardware resource 110. In an embodiment where the hardware resource 110 is installed into a system, power to reconfigure the system is taken from the system through the serial bus 116 such as 2-pin DC power.

In an embodiment, an upgrade is a recent software-firmware like microcode version that updates current software firmware-microcode previously intended for use by the hardware resource 110. In an embodiment, an upgrade is a new configuration-setting to support a software application that the hardware resource 110 has capability to process, but that was not commercially available at the time the hardware resource 110 was sold or offered for sale. In an embodiment, an upgrade is a new software application that the hardware resource 110 has capability to process, but that was not bundled with the hardware resource 110 at the time the hardware resource 110 was sold or offered for sale.

In an embodiment, the RF programming accomplishes unleashing a second capability the hardware resource 110 that is enhanced compared to the first capability of the hardware resource 110 prior to the communication to the secure database 124.

In an embodiment, RF programming of the hardware resource 110 is accomplished by the RFID tag 114 without any external power requirement except from the antenna 120. Consequently, RF programming can be accomplished by the RFID tag 114 even after the hardware resource 110 has been packaged for shipping such that line-of sight data may be obscured. As a result, both identification of the hardware resource 110 as to ULT data and performance data, and programming of the hardware resource 110 may be carried out without the need for external power pins such as from a plugged-in system.

In an embodiment, a system such as that containing the hardware resource 110 may be determined if it is compatible with an upgrade by identifying and validating the RFID tag 114 as having a unique, qualified identification. If the system is compatible, a method embodiment includes authenticating the hardware resource 110 with the remote database 124 by communicating with the RFID tag 114. Where the hardware resource 110 is commercially packaged, line-of sight identification is not necessary since the RFID tag 114 is capable of affirming whether the system is capable of an upgrade to the hardware resource 110. Consequently, RF instructions are received at the RFID tag 114 from a remote system such as the computing system 122, and line-of sight identifiers such as two-dimensional (2D) laser inscriptions are not needed.

In an embodiment, the hardware resource 110 has been down-binned and it has been sent to a potential vendor as a demonstration sample. Before the hardware resource 110 is sent, it is programmed with a trial counter to track a given number of times it is booted such that after the given number of times, it locks and cannot be used further or metered (meaning reboot a specified every n minutes) at the given binning level without receiving a renewal license from the secure database 124. Another method of tracking usage is total time the hardware resource is in operational mode, followed by one of up-binning, down-binning or locking the hardware resource. In an embodiment, after the agreed-to amount of use of the demonstration sample has been reached, the hardware resource reverts to an original configuration. According to an embodiment, the programming such as up or down-binning after agreed use may be done by permanently burning a fuse in the control logic post authentication of the license in the tag 114 by the hardware resource 110.

In an embodiment, after the given number of boots has occurred, the hardware automatically up-bins or down-bins and the potential vendor is notified. As a consequence of this embodiment, the potential vendor is sent fewer samples due to the ability of the hardware resource to do one of up-binning and down-binning such that a single demonstration sample is used in place of several otherwise. In an embodiment, the result of up-binning or down-binning and notification is that the potential vendor may receive a license to continue, or to purchase the hardware resource sample.

Programming and reconfiguring of the hardware resource 110 may be carried out at several locations and during the several phases of fabrication, assembly, test, shipping, pre-sale, and post-sale among other events.

Fab-Stage Programming

Fab-stage programming may also include assembly and test-stage programming. In an embodiment, the shipment lot has been packaged and transferred to assembly and test. Upon arrival at assembly and test, the shipment is RF-surveyed through each RFID tag.

In an embodiment during assembly and test, it becomes clear the hardware resource 110 is performing significantly below expectation. Consequently, the specific hardware resource 110 is recalled for containment. In an embodiment during assembly and test, it becomes clear the hardware resource 110 is performing significantly above expectation. Consequently, the specific hardware resource 110 is recalled for further study and commonality analysis to fine-tune the fabrication processes.

Once a hardware resource 110 has been mated with a given mounting substrate 112 and tested, the ULT data for the hardware resource 110 is rewritten as ULT-2 data that encompasses the synergy of the hardware resource 110 and the mounting substrate 112 and the unique ID of the tag 114. The ULT-2 data is recorded with the secure database 124. To avoid the time-consuming actions of socketing and programming the hardware resource 110, RF programming is carried out in mass or singulation as desired. In an example embodiment, a clock speed of 2.0 GHz is needed for a given hardware resource 110, but the hardware resource 110 operates at 2.4 GHz when mated to the given mounting substrate 112. The hardware resource is communicated to by RF with the antenna 120 signaling 121 and the hardware resource 110 answering 115. The RF programming in this embodiment includes re-fusing the hardware resource 110 to be down-binned from 2.4 GHz to 2.0 GHz as required in filling a contract for sale. The event of down-binning is recorded with the secure database 124 through the RFID tag 114.

Warehouse-Stage Programming

Warehouse-stage programming may be carried out as early as arrival at a given warehouse. In an embodiment, a shipment lot of hardware resources, each including RFID tags with access to a secure database, is received and an RF-based survey of the shipment is carried out to authenticate each unit in the shipment has arrived where it was intended.

Figure 2A:
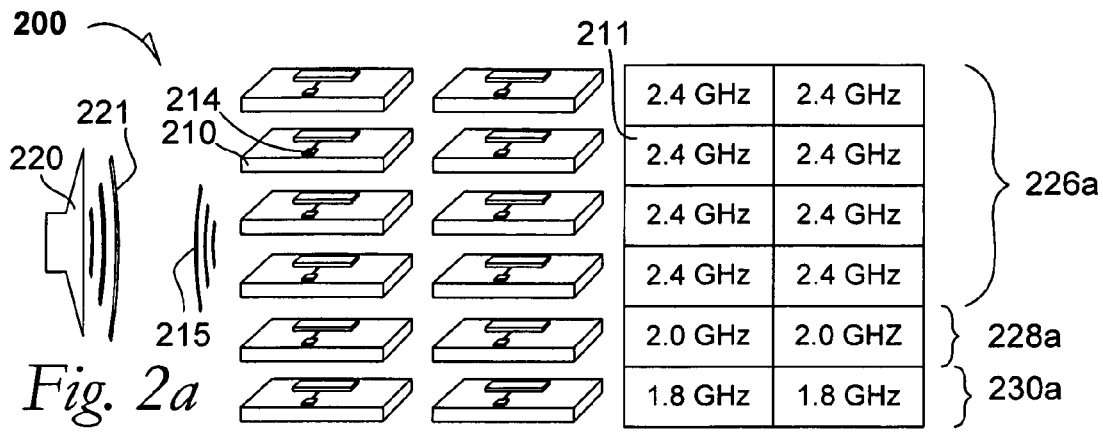
FIG. 2a is a schematic of a method according to an embodiment.

FIG. 2a is a schematic 200 of a method according to an embodiment. An array of hardware resources is depicted disposed upon mounting substrates, one hardware resource of which is indicated with reference numeral 210. The array is depicted as 12 hardware resources and a 2×6 table is located adjacent the array to represent respective ULT and performance registers, one of which corresponds to the indicated hardware resource 210 with the reference numeral 211. The indicated hardware resource 210 has been bin-split with a 2.4 GHz clock speed as a non-limiting embodiment. Bin-splitting may also be done based upon a processing-genealogy parameter that has had useful history correlated to device outcome.

In FIG. 2a, an antenna 220 is being used to communicate simultaneously to all 12 hardware resources 210. In an embodiment, the 12 hardware resources 210 are located in a post-production warehouse and they have been processed, assembled with respective mounting substrates, tested, bin-split, and configured as a shipment lot. Simultaneous communication between a secure database and all of the hardware resources through their respective RFID tags is done by multiplex (MUX) communication. In an embodiment, MUX communication may cause communication to focus on a given hardware resource such that batch communication is accomplished.

Initial best-performance data was established by querying performance parameters and recording them with the secure database. A first sub-array 226a has been bin-split to have a clock speed of 2.4 GHz (eight units), a second sub-array 228a has been bin-split to have a clock speed of 2.0 GHz (two units), and a third sub-array has been bin-split to have a clock speed of 1.8 GHz (two units). Other performance parameters may be a cause for different bin splitting, and complex bin splitting may include a first bin split for clock speed but a lower than first bin split for some other parameter such as power consumption or a process condition.

The antenna 220 is connected to a computing system such as the computing system 122 depicted in FIG. 1, and the computing system is also in communication with a remote data base such as the secure data base 124 also depicted in FIG. 1. It should be understood that RFID tag 214, although depicted as a component separate from the hardware resource 210, may be integral to the hardware resource according to an embodiment.

In an embodiment, the 12-unit array of hardware resources 210 is in a warehouse that is remote from the secure data base, and remote communication between the hardware resources 210 to the secure database is used to authenticate each component and to determine if any of the systems is compatible with an upgrade.

In an embodiment, an RF survey for extant 2.4 GHz hardware resources is done by communicating to each RFID tag. Each hardware resource in the sub-array 226a answers in the affirmative, but each hardware resource in the sub-arrays 226b and 226c answers in the negative. This method embodiment may be carried out when a specific quality of hardware resource is needed and a warehouse lot is RF surveyed to match qualified hardware resources a given software or application. In these embodiment, the first programming depicted in FIG. 2a may be referred to as first programming, whereas a repeated programming as depicted in FIGS. 2b and 2c may be referred to as "second programming", "subsequent programming" or the like.

Shipment-Stage Programming

Figure 2B:
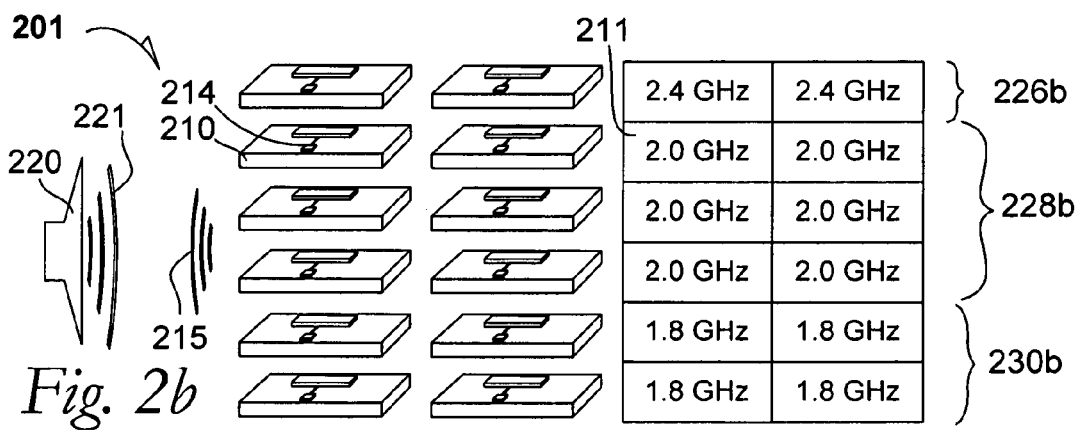
FIG. 2b is a schematic of the method depicted in FIG. 2a after further events according to an embodiment.
Figure 2C:
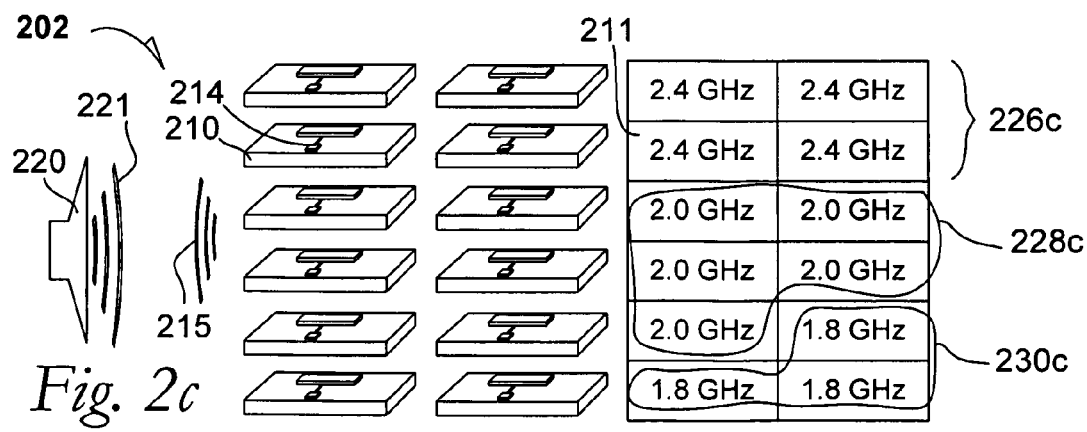
FIG. 2c is a schematic of the embodiment depicted in FIG. 2b after further events according to an embodiment.

FIG. 2b is a schematic 201 of the method depicted in FIG. 2a after further events according to a method embodiment. In a method embodiment, a purchaser has ordered 12 units, but market parameters dictate the need for only two of the systems in the 12-unit array (FIG. 2a) to have the 2.4 GHz clock speed. Consequently, six of the hardware resources in the first sub-array 226a that had a maximum 2.4 GHz clock speed, were down-binned by communication through the respective RFID tags because their maximum clock speeds are not needed by the purchaser. Consequently, the hardware resource 210, although it was evaluated at a 2.4 GHz clock speed 211 as depicted in FIG. 2a, has been down-binned to a 2.0 GHz clock speed by communication through the respective RFID tags as depicted in FIG. 2b. Similarly, the purchaser order included four units with a clock speed of 1.8 GHz, such that two of the units depicted in FIG. 2a that had a clock speed of 2.0 GHz have been down-binned to clock speeds of 1.8 GHz.

In the process of down-binning, the down-binning event is accomplished by RF programming such that the 12-unit array can be programmed by communication through the respective RFID tags without the need for line-of-sight identification. This scenario may occur where the array has already been packaged such that each system has been visually obscured. Similarly in the process of down-binning, the down-binning event is simultaneously (or at least parallel-processing) accomplished by RF programming instead of the much slower seriatim processing by physically plugging each unit into a programming socket.

In an embodiment, the 12-unit array is down-binned as depicted in FIG. 2b and the array is shipped as a commercial lot. Before shipping according to an embodiment, each unit is also locked through RF programming such that only the recognition and authentication of each unique encrypted identifier in each RFID tag will allow unlocking once received by the authorized purchaser. In an embodiment, a shipment lot is lost, misdirected, or stolen. Because each hardware resource in the lot is locked and has an encrypted unique identifier accessible through the individual RFID tag, however, activation of each hardware resource will be difficult if not impossible. This is because each hardware resource identification and authentication from a secure database communicated through each respective RFID tag.

Where the purchaser is an original equipment manufacturer (OEM) for example, the OEM is recorded on each RFID tag and each hardware resource is disabled such as by locking before shipping. For purposes of this disclosure, an "OEM" may also refer to a post-sale entity that further operates on the hardware resource-containing system, and may or may not sell it to the public. Upon delivery to the OEM, a method embodiment allows the OEM to determine if each hardware resource was intended for the OEM. If the hardware resource was so intended, the OEM is allowed to unlock the hardware resource for further assembly by communicating to each unit by the respective RFID tag.

Point-of-Sale Programming

FIG. 2c is a schematic 202 of the embodiment depicted in FIG. 2b after further events according to an embodiment. Where a purchaser has received the 12-unit lot, an antenna 220 (and accompanying computing system) are used to allow the OEM to determine if a given hardware resource in the lot was intended for the OEM. This is accomplished by querying each hardware resource in the lot by RF polling through the several RFID tags in the lot and recognizing each unique encrypted identifier that is cached in the accompanying RFID tag.

In an embodiment where a given hardware resource in the lot has been mis-delivered, the identification and authentication fails, the hardware resource remains locked, and it is imperative that it be returned to the manufacturer.

In an embodiment, a contract for sale or evaluation is established with an OEM based upon market parameters and the down-binning event illustrated between FIG. 2a and FIG. 2b has been achieved.

Before further processing of the hardware resource lot, a change in at least one market parameter is observed. The change in the market parameter may be a marketing technique according to an embodiment, where the supplier makes an offer to up-bin some or all of the systems for a given discount. The change in the market parameter may be a changed sales expectation by the OEM such as different hardware resource capability needs have been observed, compared to a previous marketing forecast. The change in the market parameter may be a software application upgrade has come on the market that may take advantage of more up-binned hardware resources according to an embodiment. The change in the market parameter may be a new software application has come on the market that may take advantage of more up-binned hardware resources according to an embodiment. The change in the market parameter may be an upgraded chipset application has come on the market that may take advantage of more up-binned hardware resources according to an embodiment. The change in the market parameter may be an entirely new chipset configuration has come on the market that may take advantage of more up-binned hardware resources according to an embodiment.

In any event, upon observing at least one change in the market parameters, the OEM communicates with the secure database and makes an offer for one of down-binning or up-binning to modify the contract.

FIG. 2c represents an example embodiment of such a response to a change in at least one market parameter. Where only two hardware resources were configured at 2.4 GHz at 226b in FIG. 2b, a net of four hardware resources have been enabled at this clock speed at 226c by the OEM receiving a new license. Where six hardware resources were configured at 2.0 GHz at 228b, a net of five hardware resources have been enabled at this clock speed at 228c. And where four hardware resources were configured at 1.8 GHz at 230b, a net of three hardware resources have been enabled at this clock speed at 230c.

Reference is again made to FIG. 1. In a first example embodiment, the hardware resource 110 is part of a system that is being point-of-sale removed from a commercial vendor. At the cash register or some appropriate location within the commercial vendor's control, the purchaser is notified that the system can be upgraded for a given price to unleash a second capability in the hardware resource 110 that is enhanced from the current configuration. Where the purchaser agrees to the offer, an RF dongle 120 is used to communicate to the hardware resource 110 through the RFID tag 114. By RF communication, it is determined that the system is compatible with an upgrade. This is accomplished by accessing the remote database 124 telephonically where the remote database is located off-site from the point-of-sale location. The hardware resource 110 is authenticated with the remote database 124, a license is granted between the owner of the remote database 124 and the purchaser, and the hardware resource 110 receives the license by use of the serial bus 116 when powered and authenticates the license that was stored in the RFID tag 114 to upgrade the hardware resource 110. Thereby programming is accomplished based upon the RF instructions without even removing the hardware resource 110 from its commercial packaging. Consequently in an embodiment, the RF programming is accomplished without powering up the hardware resource 110 from a hard-line power source including internal batteries.

In a second example embodiment, the same method is used as in the first example embodiment, except the system awakens the internal batteries to power up the hardware resource 110 and unleash a second capability.

In a third example embodiment, the same method is used as in the first example embodiment, except the upgrade is offered and accepted for a limited time.

In an embodiment, an issue arises with a given hardware resource 110 such as performance anomalies. Where the, e.g. performance anomaly is a sub-standard event, the specific hardware resource 110 may be requested for recall to remove it for study to determine if the sub-standard event may be repaired for this given hardware resource 110, or for similar hardware resources.

Where the, e.g. performance anomaly exceeds the standard in a surprising, positive manner, the specific hardware resource 110 may be requested for recall to remove it for study to determine how the above-standard behavior may be replicated for similar hardware resources or for future production.

Post Point-of-Sale Programming

In an example embodiment, a hardware resource that is contained in a smart phone has been in use after a point-of-sale event, and software has finally become available that can take advantage of more capability in the hardware resource. In this embodiment, a hardware resource disposed in the smart phone has been down-binned and a time period has passed during which time software upgrades or new software has been developed that can take advantage of the hardware resource in an up-binned reconfiguration. Where the down-binning at the warehouse or at assembly and test may be referred to as first programming, a repeated programming such as this up-binning embodiment may be referred to as subsequent programming.

For example, new software has been developed, and the software is correlated to a shipment lot of hardware resources that was previously sold to an OEM. The user may take the hardware resource to an authorized vendor for up-binning. Where authentication of the RFID tag 114 is true, ULT and performance data related to the hardware resource are shared with the secure database. If reconfiguring of the hardware resource 110 is allowable, programming is carried out by sending and receiving RF instructions through the RFID tag.

As a consequence of the programming, the ULT data is updated which means the specific programming is recorded as an event not only related to the synergy of the hardware resource and the mounting substrate, but it is also recorded with and the secure database.

Figure 3:
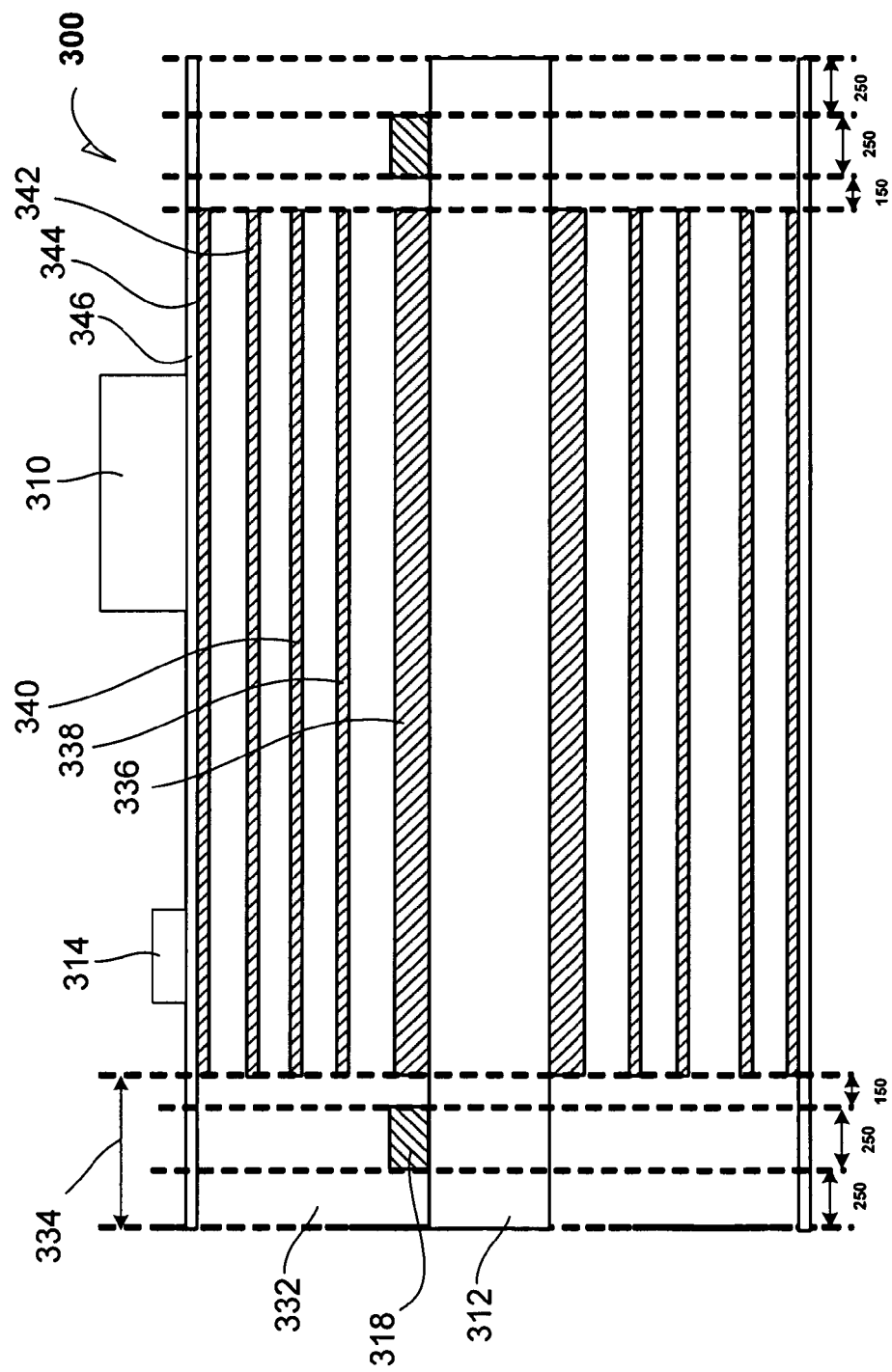
FIG. 3 is an elevational cross section of a mounting substrate according to an example embodiment.

FIG. 3 is a cross-section elevation of a mounting substrate 300 according to an example embodiment. The mounting substrate 300 includes a core 312 and an RF antenna 318 embedded in several layers including interlayer dielectric material 332. The RF antenna 318 is disposed in a keep-out zone (KOZ) 334. In the illustrated embodiment, the KOZ 334 has a 250 micrometer (μm) buffer at the edge and a 150 μm buffer opposite the edge and adjacent the RF antenna 318. In an embodiment, the RF antenna 318 is 250 μm as illustrated. In an embodiment, the RF antenna 318 is about 200 μm thick in the Z-dimension.

Several metallization layers are depicted at 336, 338, 340, 342, and 344 according to an embodiment. A solder mask 346 is also depicted against the mounting substrate at the upper surface.

In an embodiment, an RFID tag 314 is located on the solder mask 346 and electrical communication to the RF antenna 318 is coupled though the any or all of the several metallization layers. Similarly, a hardware resource 310 is also disposed on the mounting substrate 300 on the solder mask 346 upper surface.

In an embodiment, the RFID tag is to be located inside the mounting substrate 300 such as taking up some of the space occupied by the core 312. Consequently, the RFID tag (part of the core space 312) and the RF antenna are integral to inner structures of the mounting substrate 300. Similar structure are reflected in the negative-Z direction starting at the core 312.

Figure 4:
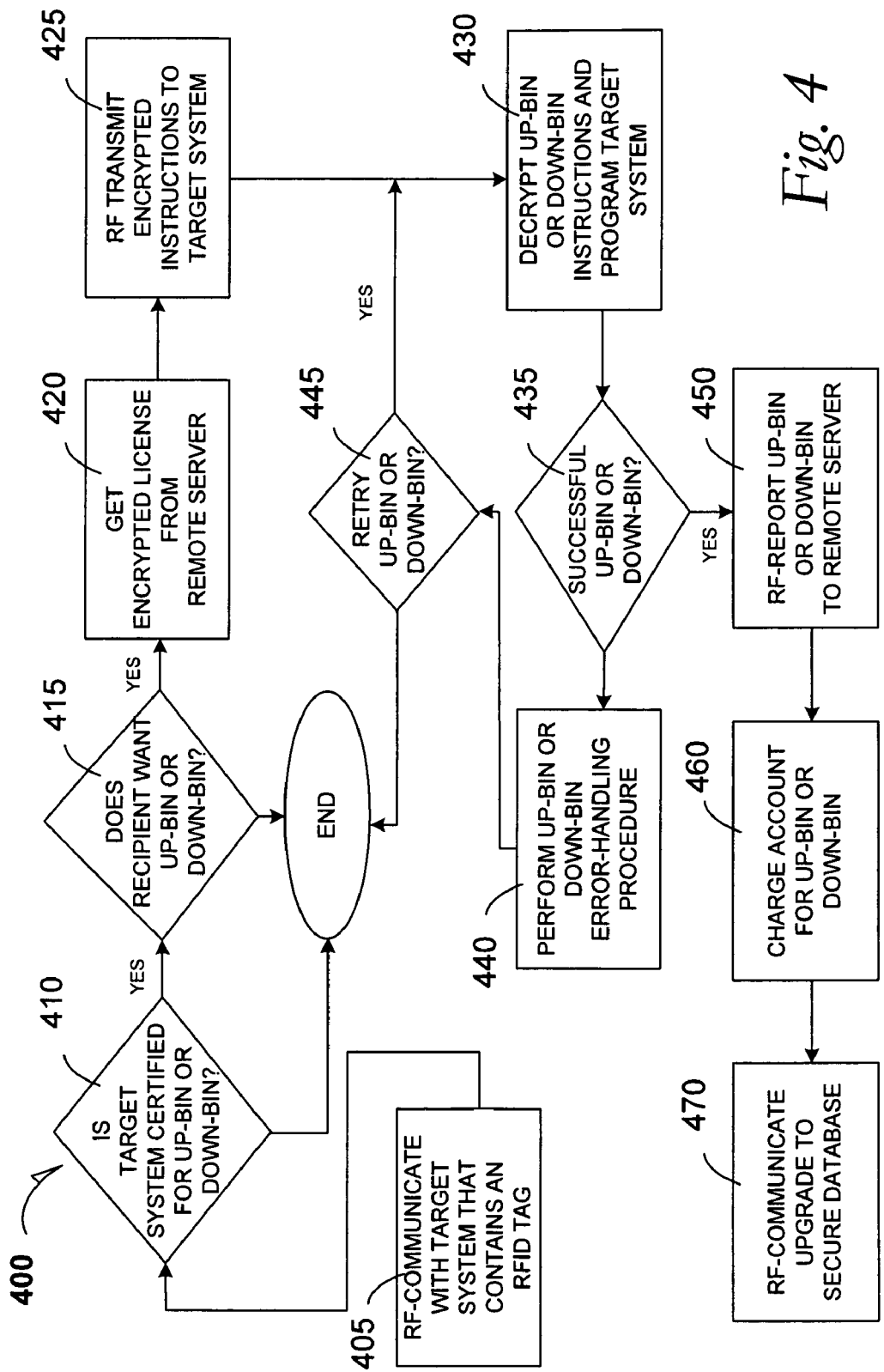
FIG. 4 is a flow diagram of a method according to several embodiments.

FIG. 4 is a flow diagram of a method 400 according to an example embodiment. A method 400 is used to up-bin or down-bin a hardware resource of a target system.

At 405, the method 400 includes RF communicating with a target system by use of the RFID tag contained in the system. For example, a remote server of an OEM, reseller, or the like communicates with the target system by querying the RFID tag that is coupled to the hardware resource. In various embodiments, the communication may be transparent to a user of the system. In an embodiment, the remote server requests information regarding a configuration of the target system so that a determination may be made as to whether the hardware resource of the target system is able to be up-binned or down-binned.

At 410, the target system is certified for an up-bin or down-bin. In various embodiments, information in a supported configuration ULT table is communicated to the remote server upon a request by the remote server. This communication between the remote server and the target system may also be transparent to an end user. The remote server determines that the target system is not certified for an up-bin or down-bin. If it is not certified, the method 400 is terminated.

At 415, if the target system is certified for an up-bin or down-bin, next it may be determined whether the recipient of the hardware resource desires to up-bin or down-bin the system. While various manners of determining whether a system is desired to be up-binned or down-binned may exist, in many embodiments a message from the remote server to the target system may be sent. The message may be caused to be displayed on the target system, for example, by a pop-up or other message block to indicate availability of the up-bin or down-bin. If the recipient of the hardware resource does not desire the up-bin or down-bin, the method 400 is terminated.

At 420, if instead a holder of a hardware resource desires the up-bin or down-bin, the target system may get an encrypted license from the remote server. In various embodiments, the encryption key is a unique code that identifies the target system and/or a particular hardware resource of the system, e.g., a processor or chipset. When the encryption key is sent, the remote server accesses the unique ULT record for the given hardware resource.

The remote server uses the encrypted key to generate encrypted instructions that enable the up-bin or down-bin. For example, the remote server generates microcode instructions and optionally encrypts the instructions to prevent unauthorized access to the instructions. The microcode instructions are used by the target system to appropriately program one or more hardware components to enable the feature(s) for operation. The remote system also generates validation instructions for transmission to the target system to confirm that the up-bin or down-bin was successful and that the target system can perform code that implements the desired feature.

At 425, the remote server accordingly transmits encrypted up-bin or down-bin instructions to the target system.

At 430, the target system decrypts the up-bin or down-bin instructions with the decryption key corresponding to the encrypted instructions, and it programs the target system. In a non-limiting example embodiment, decrypted microcode instructions are used to securely allow up-binning or down-binning to occur with less concern for security breaches. In other words, microcode instructions are decrypted and sent directly to a processor core, where the microcode instructions are executed internally to initiate programming. Because the transmitted instructions may be in microcode in these embodiments, the ability of unauthorized extraction of the instructions or to provide the instructions to unauthorized parties is significantly reduced.

In some embodiments, the microcode instructions are executed by the processor to initiate the programming of the feature(s) to be upgraded. For example, in some embodiments the microcode instructions initiate dynamic fuse programming logic within a processor or other hardware component to open one or more fuses to enable a path to circuitry previously unavailable. In these embodiments, the dynamic fuse programming logic may cause a source voltage to be provided to a fuse bank or the like to cause the selected fuses to be enabled. Upon successful enabling of a fuse, a path is made to circuitry that performs the feature. At 435 it is determined whether the up-bin or down-bin was successful after programming the component to enable the feature. In various embodiments, code transmitted by the remote server may be used to verify operation of the enabled feature. For example in an embodiment, validation code is sent with the microcode instructions. Upon completion of the programming, the target system executes the validation code. The validation code may exercise the newly enabled circuitry to verify that it operates for its intended purpose, and more specifically to verify that it operates in the specific configuration of the target system.

At 435, where it is determined the up-bin or down-bin was not successful, control passes to block 440 where an error handling procedure is performed. In various embodiments, error handling code may be implemented on the target system to handle the error. In some embodiments, the error handling procedure may be downloaded from the remote source. At 445, after the error handling code is performed, it is determined whether to retry the up-bin or down-bin process. For example, if the error handling routine corrected the error, the up-bin or down-bin process may be reattempted. If the up-bin or down-bin is to be retried, control returns to block 430.

If instead at 435 it is determined that the up-bin or down-bin was successful, the up-bin or down-bin is reported to the remote server at 450. Specifically, information from the supported configuration ULT table is sent to the remote server to indicate successful completion of the up-bin or down-bin. In addition to the information from the supported configuration table, information identifying the target system may be included so that the remote server can take appropriate measures.

At 460 in an example embodiment, the remote server charges an account associated with the target system for the up-bin or down-bin. For example, an IT department of an enterprise maintains an account with the OEM that implements the remote server. In an embodiment, different measures of paying for upgrades are used. For example in an embodiment, an individual end user may provide credit card information to authorize billing charges for an up-bin or down-bin desired by the end user.

In addition to receiving payment for the up-binning or down-binning, the remote server may store information regarding the up-bin or down-bin including, for example, information regarding the identification of the target system, the upgrades effected, and additional information about the target system, such as platform, build, image, and the like. Further, as shown in FIG. 4 at 470, the remote server communicates the up-bin or down-bin information to a central database.

Figure 5:
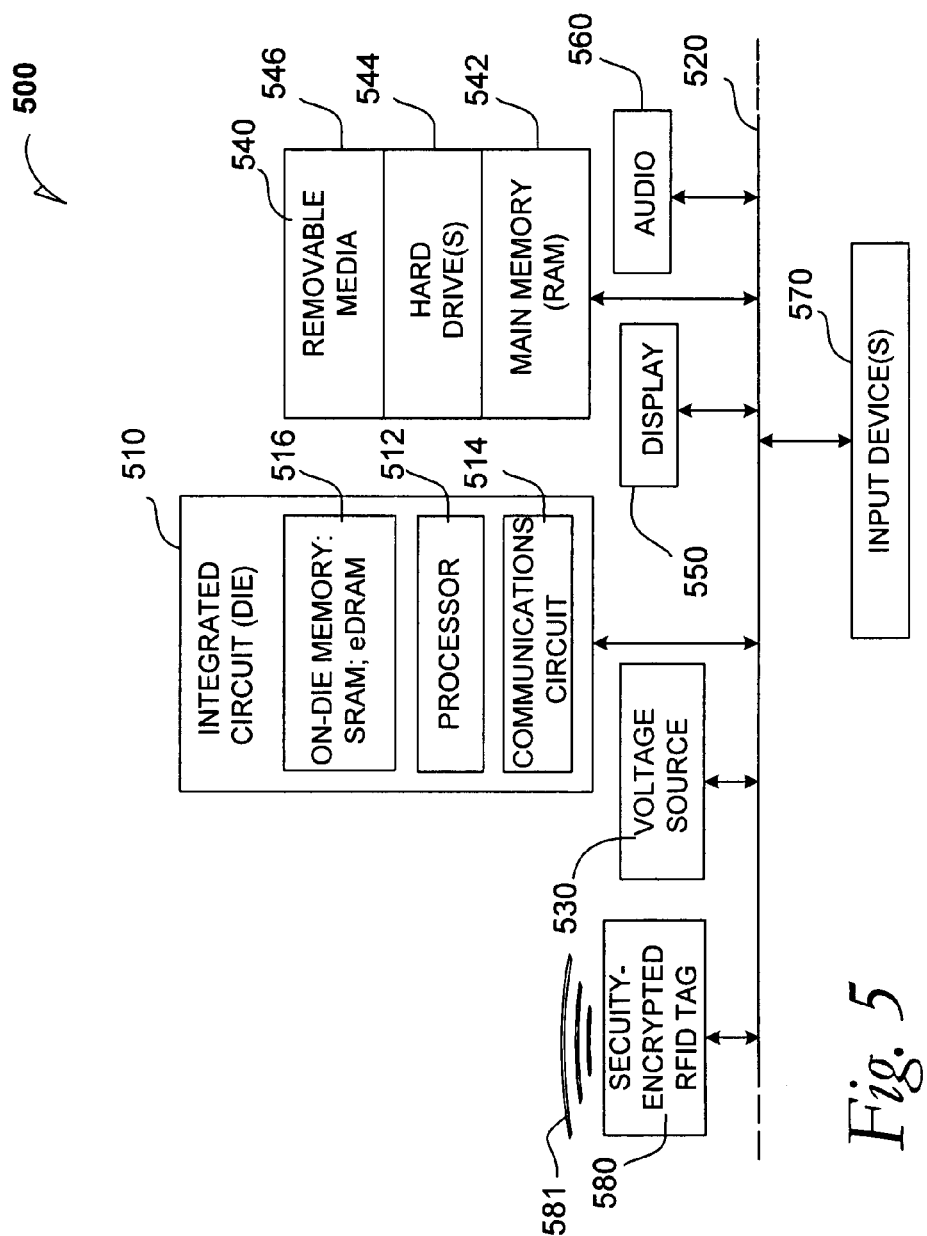
FIG. 5 is a block diagram of a system according to an example embodiment.

FIG. 5 is a block diagram of a system according to an example embodiment. The electronic system 500 as depicted can embody hardware resources such as semiconductive devices coupled to a security-encrypted RFID tag 580 embodiment as set forth in this disclosure. In an embodiment, the electronic system 500 is a computer system that includes a system bus 520 to electrically couple the various components of the electronic system 500. The system bus 520 is a single bus or any combination of busses according to various embodiments. The electronic system 500 includes a voltage source 530 that provides power to the integrated circuit 510. In some embodiments, the voltage source 530 supplies current to the integrated circuit 510 through the system bus 520.

The integrated circuit 510 is electrically coupled to the system bus 520 and includes any circuit, or combination of circuits according to an embodiment. In an embodiment, the integrated circuit 510 includes a processor 512 that can be of any type. As used herein, the processor 512 may mean any type of circuit such as, but not limited to, a microprocessor, a microcontroller, a graphics processor, a digital signal processor, or another processor. Other types of circuits that can be included in the integrated circuit 510 are a custom circuit or an application-specific integrated circuit (ASIC), such as a communications circuit 514 for use in wireless devices such as cellular telephones, pagers, portable computers, two-way radios, and similar electronic systems. In an embodiment, the processor 510 includes on-die memory 516 such as static random-access memory (SRAM). In an embodiment, the processor 510 includes embedded on-die memory 516 such as embedded dynamic random-access memory (eDRAM) that can be a cache memory for the processor.

In an embodiment, the electronic system 500 also includes an external memory 540 that in turn may include one or more memory elements suitable to the particular application, such as a main memory 542 in the form of RAM, one or more hard drives 544, and/or one or more drives that handle removable media 546, such as diskettes, compact disks (CDs), digital variable disks (DVDs), flash memory keys, and other removable media known in the art. The various memory functionalities can contain semiconductive devices with a security-encrypted RFID tag embodiment.

In an embodiment, the electronic system 500 also includes a display device 550, an audio output 560. In an embodiment, the electronic system 500 includes a controller 570, such as a keyboard, mouse, trackball, game controller, microphone, voice-recognition device, or any other device that inputs information into the electronic system 500.

The security-encrypted RFID tag 580 may be coupled to the system bus 520 and RF communication 581 may be effected between the system 500 and a secure database for identification, authentication, unlocking, and one of up-binning and down-binning the hardware resource(s).

As shown herein, the integrated circuit 510 can be implemented in a number of different embodiments, including hardware resources such as semiconductive devices with a security-encrypted RFID tag, an electronic system, a computer system, one or more methods of fabricating an integrated circuit, and one or more methods of fabricating an electronic assembly that includes a hardware resource such as a semiconductive devices with a security-encrypted RFID tag as set forth herein in the various embodiments and their art-recognized equivalents. The elements, materials, geometries, dimensions, and sequence of operations can all be varied to suit particular transistor apparatus with security-encrypted RFID tag embodiments.

It may now be understood that software code instructions for the several embodiments using the RFID tag and authentication to a secure database may be recorded on conventional computer-driven media such as a disk drive, and that such instructions may be executed by reading the code from the computer-driven media.

Reference throughout this disclosure to "one embodiment" or "an embodiment" means that a particular feature, structure, or characteristic described in connection with which the embodiment is included in at least one embodiment of the present invention. The appearance of the phrases "in one embodiment" or "in an embodiment" in various places throughout this disclosure are not necessarily all referring to the same embodiment. Furthermore, the particular features, structures, or characteristics may be combined in any suitable manner in one or more embodiments.

Terms such as "upper" and "lower" may be understood by reference to the X-Z or Y-Z coordinates, and terms such as "adjacent" may be understood by reference to the illustrated X-Y coordinates. It is understood the illustrated embodiments may be found in various orientations including inverted and rotated and that these terms are relative.

The Abstract is provided to comply with 37 C.F.R. §1.72(b) requiring an abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A method comprising:
   determining if a system is compatible with an up-bin or down-bin to a hardware resource of the system, wherein the system includes a radio-frequency identification (RFID) tag;
   authenticating the hardware resource with a remote data base;
   receiving radio-frequency (RF) instructions at the RFID tag from a remote system to up-bin or down-bin the hardware resource; and
   programming the hardware resource based on the RF instructions, wherein the hardware resource includes a first capability, and wherein programming the hardware resource includes unleashing a second capability in the hardware resource that is different compared to prior to programming.

2. The method of claim 1, wherein unleashing a second capability is one of up-binning or down-binning the hardware resource.

3. The method of claim 1, wherein determining is first determining, wherein authenticating is first authenticating, wherein receiving is first receiving, and wherein programming is first programming, the method further including:
   subsequent determining if the system is compatible with reconfiguration to the hardware resource of the system;
   subsequent authenticating the hardware resource with a remote data base;
   subsequent receiving RF instructions from a remote system to subsequent reconfigure the hardware resource; and
   subsequent programming the hardware resource based on the RF instructions.

4. The method of claim 1, wherein determining is first determining, wherein authenticating is first authenticating, wherein receiving is first receiving, and wherein programming is first programming, the method further including:
   subsequent determining if the system is compatible with reconfiguration to the hardware resource of the system;
   subsequent authenticating the hardware resource with a remote data base;
   subsequent receiving RF instructions from a remote system to subsequent reconfigure the hardware resource;
   subsequent programming the hardware resource based on the RF instructions;
   wherein the hardware resource included a second capability, and wherein subsequent programming the hardware resource includes unleashing the subsequent capability in the hardware resource that is enhanced compared to prior to subsequent programming.

5. The method of claim 1, wherein the hardware resource includes a first capability, and wherein programming the hardware resource includes unleashing a second capability in the hardware resource that is enhanced compared to prior to programming, the method further including:
monitoring usage of the hardware resource; and
reverting the capability to the first capability.

6. The method of claim 1, wherein the hardware resource includes a first capability, and wherein programming the hardware resource includes unleashing a second capability in the hardware resource that is enhanced compared to prior to programming, the method further including:
monitoring usage of the hardware resource; and
changing the capability to a third capability that is different from the first capability and from the second capability.

7. The method of claim 1, wherein the hardware resource is one of a plurality of hardware resources, and wherein programming the plurality of hardware resources is done simultaneously.

8. The method of claim 1, wherein the hardware resource is one of a plurality of hardware resources, and wherein programming the plurality of hardware resources is done for less than all the plurality of hardware resources.

9. The method of claim 1, wherein the hardware resource is one of as plurality of dissimilar hardware resources, wherein programming includes:
first programming at least one first hardware resource according to a first capability to unleash more capability in the at least first hardware resource; and
second programming at least one subsequent hardware resource according to a subsequent capability to unleash more capability in the at least one subsequent hardware resource.

10. A method comprising:
recording manufacture of a hardware resource to a data base and to the hardware resource with a unique encrypted identifier by use of an RFID tag coupled to the hardware resource, including unit-level traceability (ULT) data of at least three of date of manufacture, fab, equipment used, process flow, and wafer-site origin location of the hardware resource on a wafer;
characterizing performance of the hardware resource;
bin splitting the hardware resource;
down-binning the hardware resource;
establishing a contract thr sale or evaluation with an outside equipment manufacturer (OEM) based upon market parameters;
shipping the hardware resource under the contract; and
offering an up-binning or a down-binning license relative to the contract.

11. The method of claim 10, further including up-binning the hardware resource by radio-frequency (RF) communication.

12. The method of claim 10, further including down-binning the hardware resource by radio-frequency (RF) communication.

13. The method of claim 10, wherein recording the hardware resource includes recording to a radio-frequency identification (RFID) tag that is an integral pan of the hardware resource.

14. The method of claim 10, wherein recording to the hardware resource includes recording to the RFID tag, wherein the RFID tag is disposed on a mounting substrate on which the hardware resource is mounted, and wherein the mounting substrate also has ULT data recorded on the RFID tag.

15. The method of claim 10, wherein up-binning or down-binning the hardware resource is carried out exclusively through the RF communication.

16. The method of claim 10, wherein up-binning or down-binning the hardware resource is carried out partially through the RF communication and partially through power assistance from a physically coupled component.

17. The method of claim 10, wherein before the shipping the hardware resource, the method includes disabling the hardware resource.

18. The method of claim 10, further including:
recording the OEM on the hardware resource;
disabling the hardware resource before the shipping;
allowing the OEM to determine if the hardware resource was intended for the OEM; and if so intended
allowing the OEM to unlock the hardware resource.

19. The method of claim 10, further including observing a change in the market parameters, and wherein offering the up-binning or down-binning license to the contract is related to the change in the market parameters.

20. A method comprising:
producing a first plurality of hardware resources on a wafer;
recording manufacture of the hardware resources to a data base and to each of the hardware resources with unique encrypted identifiers, including at least three of: date, fab, equipment used, process flow, and die-site location of each of the first plurality of the hardware resources on a wafer prior to singulation;
characterizing performance of each of the hardware resources;
bin splitting the hardware resources;
assembling a second plurality of hardware resources for a contract obligation, wherein the second plurality of hardware resources includes at least one hardware resource from the first plurality, and wherein the at least one hardware resource is coupled to a radio-frequency identification (RFID) tag that contains an encrypted unique identifier;
down-binning the at least one hardware resource;
shipping the hardware resource under the contract; and
programming the hardware resource by use of the RFID tag.

21. The method of claim 20, wherein programming the hardware resource comprises permanently programming the hardware resource by use of dynamic fusing performed according to the microcode instructions.

22. An article comprising a machine-readable storage medium containing instructions that if executed by a machine enable the machine to perform a method comprising:
determining if a target system is compatible with an up-bin or down-bin to a hardware resource of the system by communicating to a radio-frequency identification (RFID) tag coupled to the system;
authenticating the hardware resource with a remote data base;
receiving radio-frequency (RF) instructions from a remote system to reconfigure the hardware resource; and
RF programming the hardware resource through the RFID tag based on the RF instructions, wherein the hardware resource includes a first capability, and wherein programming the hardware resource includes unleashing a second capability in the hardware resource that is different compared to prior to programming.

23. The article of claim 22, wherein the method further comprises providing validation instructions to the target system, the validation instructions to confirm that the upgrade to the target system was successful.

24. The article of claim 22, wherein the method further comprises:
  charging an account associated with the target system for the upgrade upon confirmation that the upgrade was successful; and
  recording information regarding the target system and the upgrade in a secure database.

25. The article of claim 22, wherein the method further includes preparing and transmitting the programming instructions in an encrypted manner according to an encryption key received from the target system.

26. An article comprising:
  a radio-frequency identification (RFID) tag;
  a hardware resource coupled to the RFID tag, wherein the RFID tag includes a unique encrypted identifier and cached unit-level traceability (ULT) data for the hardware resource;
  a serial bus that couples the RFID tag to the hardware resource;
  a radio-frequency (RF) communication capability for reconfiguring the hardware resource;
  at mounting substrate upon which the hardware resource and the RFID tag are disposed wherein the mounting substrate is enclosed by a shell; and
  an RF antenna connected to the mounting substrate, wherein the RF antenna is coupled to the RFID wand wherein the RF antenna is integrated into the shell of the system into which the RFID tag is installed.

27. The article of claim 26, wherein the RF antenna is a loop antenna.

28. The article of claim 26, wherein the RF antenna is a dipole antenna.

29. The article of claim 26, further wherein RF antenna is 250 micrometer (μm) wide.

30. The article of claim 26, further wherein RF antenna is 250 micrometer (μm) wide and about 200 μm thick.

31. The article of claim 26, wherein the RF communication capability includes reconfiguring software including one of up- and down-grading thereof through use of the hardware resource.

32. The article of claim 26, wherein RF communication capability includes reconfiguring firmware including one of up- and down-grading thereof through use of the hardware resource.

33. The article of claim 26, wherein the ULT includes at least one of date of manufacture, fab, equipment used, process flow, wafer-site origin, clock speed, power consumption, cache size, instruction set, and bin split.

34. A method comprising:
  determining if a system is compatible with a reconfiguration to a hardware resource of the system, wherein the system includes a radio-frequency identification (RFID) tag, the hardware resource, a serial bus coupled therebetween, a mounting substrate, and an antenna disposed on the mounting substrate;
  authenticating the hardware resource with a remote data base;
  receiving radio-frequency (RF) instructions at the RFID tag from a remote system to reconfigure the hardware resource; and
  programming the hardware resource through the serial bus based on the RF instructions, wherein the hardware resource includes a first capability, and wherein programming the hardware resource includes unleashing a second capability in the hardware resource that is different compared to prior to programming.

35. The method of claim 34, wherein unleashing a second capability is one of up-binning or down-binning the hardware resource.

36. The method of claim 34, wherein determining is first determining, wherein authenticating is first authenticating, wherein receiving is first receiving, and wherein programming is first programming, the method further including:
  subsequent determining if the system is compatible with reconfiguration to the hardware resource of the system;
  subsequent authenticating the hardware resource with a remote data base;
  subsequent receiving RF instructions from a remote system to subsequent reconfigure the hardware resource; and
  subsequent programming the hardware resource based on the RF instructions.

37. The method of claim 34, wherein determining is first determining, wherein authenticating is first authenticating, wherein receiving is first receiving, and wherein programming is first programming, the method further including:
  subsequent determining if the system is compatible with reconfiguration to the hardware resource of the system;
  subsequent authenticating the hardware resource with a remote data base;
  subsequent receiving RF instructions from a remote system to subsequent reconfigure the hardware resource;
  subsequent programming the hardware resource based on the RF instructions;
  wherein the hardware resource included a second capability, and wherein subsequent programming the hardware resource includes unleashing the subsequent capability in the hardware resource that is enhanced compared to prior to subsequent programming.

38. The method of claim 34, wherein the hardware resource includes a first capability, and wherein programming the hardware resource includes unleashing a second capability in the hardware resource that is enhanced compared to prior to programming, the method further including:
  monitoring usage of the hardware resource; and
  reverting the capability to the first capability.

39. The method of claim 34, wherein the hardware resource includes a first capability, and wherein programming the hardware resource includes unleashing a second capability in the hardware resource that is enhanced compared to prior to programming, the method further including:
  monitoring usage of the hardware resource; and
  changing the capability to a third capability that is different from the first capability and from the second capability.

* * * * *